United States Patent
Nelson

(10) Patent No.: US 8,239,662 B1
(45) Date of Patent: Aug. 7, 2012

(54) NETWORK BASED OPERATING SYSTEM ACROSS DEVICES

(75) Inventor: Jeffrey Nelson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 595 days.

(21) Appl. No.: 12/408,247

(22) Filed: Mar. 20, 2009
(Under 37 CFR 1.47)

Related U.S. Application Data

(60) Provisional application No. 61/038,339, filed on Mar. 20, 2008.

(51) Int. Cl.
*G06F 9/24* (2006.01)

(52) U.S. Cl. ............ 713/1; 713/2; 713/100; 717/174; 717/175

(58) Field of Classification Search ............ 713/1, 2, 713/100; 717/168, 169, 171, 174, 175, 176
See application file for complete search history.

(56) References Cited

U.S. PATENT DOCUMENTS

| | | | |
|---|---|---|---|
| 7,343,560 B1 * | 3/2008 | Tanner et al. | 715/735 |
| 2003/0126242 A1 * | 7/2003 | Chang | 709/222 |
| 2004/0153694 A1 * | 8/2004 | Nicholson et al. | 714/4 |
| 2005/0091349 A1 * | 4/2005 | Scheibli | 709/222 |
| 2006/0010314 A1 | 1/2006 | Xu | |
| 2006/0047946 A1 * | 3/2006 | Keith, Jr. | 713/2 |
| 2009/0083404 A1 * | 3/2009 | Lenzmeier et al. | 709/221 |

OTHER PUBLICATIONS

Fried, I., "Start-Up Xcerion Offers a Peek at the Clouds", News.com, accessed at http://www.news.com/8301-13860_3-9893519-56.html?tag=more, dated Mar. 14, 2008, accessed on Mar. 17, 2008, 4 pages.

La Monica, M., "Is the 'Web OS' Just a Geek's Dream?", News.com, accessed at http://www.news.com/Is-the-Web-OS-just-a-geeks-dream/2100-7345_3-6174111.html, dated Apr. 9, 2007, accessed on Mar. 17, 2008, 2 pages.

* cited by examiner

*Primary Examiner* — Paul Yanchus, III
(74) *Attorney, Agent, or Firm* — Sterne, Kessler, Goldstein & Fox PLLC

(57) ABSTRACT

A system for providing an operating system over a network to a local device is provided. The system includes a base image server, a preferences image server and an image loader. The system may also include a boot loader. A method for providing an operating system over a network to a local device is also provided. The method includes receiving a request for an operating system. The method further includes transmitting to a local device remotely stored base and preferences images that are configured for combination into a combined image. The method may also include the synchronizing the combined image with a cached version of an operating system on the local device.

18 Claims, 3 Drawing Sheets

NETWORK BASED OPERATING SYSTEM ACROSS DEVICES

BACKGROUND

1. Field of the Invention

Embodiments of the present invention relate to operating systems and networks.

2. Background Art

Computers execute many different software programs, including operating systems. An operating system manages the resources of a computer so that many different processes can share the computer memory and processor. Basic tasks performed by an operating system include allocating memory, prioritizing system requests, controlling input and output devices, facilitating networking and/or managing file systems. Most operating systems enable a user to manage the operating system with a command line interpreter or graphical user interface. The operating system also forms a platform for other system software and for application software. Common operating systems now include MAC OS X, WINDOWS, UNIX and LINUX operating systems.

However, there are several limitations to the current use of operating systems. For instance, most of these operating systems require frequent updates that can at times be troublesome or costly. One current method of updating operating systems provides patches and replaces portions of a local storage or system registry. This limits the use of the local device when it is being updated and requires frequent reboots. These issues are costly and time consuming for managers of large numbers of computers. Operating systems also continue to rapidly grow in size and strain the resources of many computers and mobile devices.

Mobile devices such as personal data assistants (PDAs), smart phones and pocket PCs, have also come to use larger embedded operating systems, including Palm OS and Windows Mobile. These embedded operating systems often are bundled with a basic suite of application software for managing personal information and enjoying multimedia content. Modern mobile devices house operating systems that provide web browsing, multitasking and increased security.

Mobile device operating systems are also limited. They often do not provide the level of functionality of a typical desktop or laptop operating system. Some mobile devices allow for the synchronization of files and contact information, but this often involves connecting directly to a home computer in order to ensure the same information exists on both the home computer and the mobile device. In addition, this often pertains only to settings, files and other limited information. Recent mobile operating systems provide for users to develop their own applications for the mobile device. However, this flexibility is limited to application development only, not the transferability of the operating system itself over a network.

Furthermore, a computer or mobile device is often tied to a single operating system, which resides wholly on the local device or its hard disk. Moving to a different device, hardware configuration, vendor, or version of an operating system requires a great interruption in service to the local device, a system overhaul or even a new local device. It has also not been reasonably possible to synchronize the operating system and configuration across different devices.

BRIEF SUMMARY

Embodiments of the present invention relate to systems and methods for providing an operating system over a network to a local device. Embodiments of the invention also relate to synchronizing and updating an operating system. In an embodiment, a system for providing an operating system includes a base image server, a preferences image server and an image loader. The base image server can transmit a base image of the operating system. The preferences image server can transmit a preferences image. The image loader can be configured to combine the base image and the preferences image. The combined image can be used to provide a full version of the operating system on the local device.

In another embodiment, a computer-implemented method for providing an operating system over a network to a local device is provided. The method includes receiving a request for an operating system from the local device based upon local device information. The local device may lack a full version of the operating system. The method further includes transmitting a base image from a base image server and at least one preferences image from a preferences image server to the local device. The base and preferences images are configured for combination into a combined image by an image loader on the local device in order to provide the full version of the operating system on the local device.

In a further embodiment, a computer-implemented method for providing an operating system to a local device is provided. The method includes determining a status of a network connection between the local device and a remote base image server. The local device may lack a full version of the operating system. The method further includes boot loading a cached version of the operating system on the local device upon detection of an unconnected status of the network connection. The method also includes checking the status of the network connection.

In another embodiment, a computer-implemented method for providing an operating system over a network to a local device is provided. The method includes detecting a connected status of the network connection subsequent to an unconnected status of the network connection. The method also includes using local device information to determine an appropriate version of the operating system for the local device. The method further includes transmitting a request for the appropriate operating system to at least one of a remote base image server and a remote preferences image server and receiving a base image from the remote base image server and at least one preferences image from the preferences image server. The method includes combining the base image and the at least one preferences image into a combined image in order to provide a full version of the operating system on the local device.

In another embodiment, a computer-implemented method for providing an operating system over a network to a local device is provided. The method includes determining a status of a network connection between the local device and a remote base image server. The local device may lack a full version of the operating system. The method further includes receiving a request for an appropriate operating system from the local device upon detection of a connected status of the network connection subsequent to an unconnected status. The appropriate operating system may be determined based upon a hardware configuration of the local device or a cached version of an operating system on the local device. The method also includes transmitting a remotely stored operating system base image and a remotely stored preferences image based upon the determination. The base and preferences images are configured for combination by an image loader on the local device in order to provide the full version of the operating system on the local device.

In another embodiment a computer-implemented providing a full version of an operating system over a network to a local device is provided. The method includes storing the full version of the operating system on a remote application server. The method also includes providing a third party use of the full version of the operating system. The third party receives the full version of the operating system on the local device from the remote application server.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
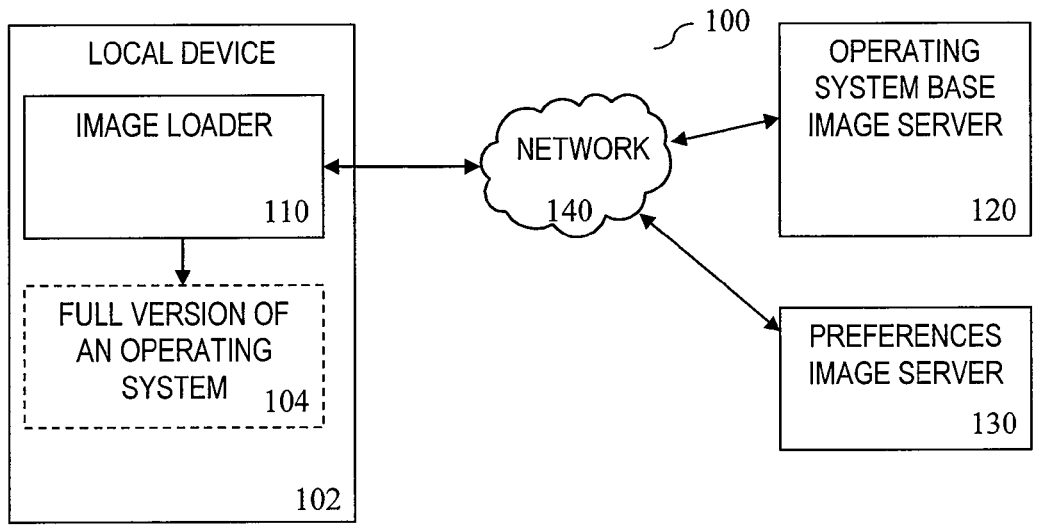
FIG. 1 illustrates a system for providing an operating system, according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to providing an operating system. The operating system involves an operating system base image and one or more operating system preferences images. An operating system base image may be a file or set of files which contain the root file system and core instructions for loading an operating system kernel. Providing an operating system may involve, but is not limited to, providing all or part of an operating system to a local device from another device or a remote server. The operating system may be provided over a network or the Internet. An operating system may also be updated over a network.

In a further feature, providing and updating an operating system may involve synchronization. Synchronization may include determining and matching a correct or desired version of an operating system between devices or computers. Synchronization may also include providing and matching another image, version, or full version of an operating system. The synchronization may take place during use of the operating system. The synchronization may also take place with little or no interruption to the user of the operating system. Benefits include, among others, collaboration, fast updates, synchronized desktops, synchronized devices and pervasive computing. As would be appreciated by those skilled in the relevant art(s), the update of an operating system may be performed in other ways without departing from the scope and spirit of the invention. The synchronization of an operating system may also be performed in other ways without departing from the scope and spirit of the invention.

A full version of an operating system can include, but is not limited to, the full, recommended, or desired range of functionality of an operating system. A full version can include full replication of files, applications and operating system functionality. Though described as a full version, this version may have a small footprint. For instance, this footprint may be small compared to the available memory on a local device. Some of the functions of the full version could also be performed by a remote application server. In some cases, the remote application server could provide the majority of the resources and perform the bulk of the processing. At the same time, the user can use the operating system through an interface on the local device.

As stated above, a full version of an operating system may be provided to a local device with a small footprint. A smaller footprint of an operating system may involve a fully operational operating system that has fewer applications or less functionality than a larger operating system. In some cases, the smaller footprint operating system may include the ability to upgrade to a larger version of an operating system. This may involve determining which version of an operating system is appropriate based upon client device information. There are many benefits to having a smaller footprint, as would be appreciated by those skilled in the relevant art(s), given this description.

In another example, an operating system may be synchronized across one or more other devices. In an embodiment, portions of the operating system may be synchronized to a second device. For example, a desirable program installed on the local device can be automatically synchronized to a second device by copying one or more operating system base images or preference images containing new customizations. In some cases, a local device may require the software or functionality provided by a second device in order to run a full version of an operating system. This operating system may also have a small footprint. Such an operating system may be synchronized with a larger version, a different version, a different type or brand, or a full version of an operating system.

FIG. 1 illustrates an exemplary system 100 for providing an operating system over a network to a local device, according to an embodiment of the present invention. System 100 shows image loader 110 on local device 102. Local device 102 may be a processing device (e.g., computer, mobile device, laptop, cell phone, smart phone, or media player). System 100 also shows an operating system base image server 120 and preferences image server 130. These image servers are coupled to image loader 110 over network 140. These image servers are also configured to transmit the images. Operating system base image server 120 may store or receive from network storage a base image. In an embodiment, a base image can include, among other things, a kernel or a full version of an operating system. In another embodiment, it can include a larger or different version of an operating system. Preferences image server 130 may store or receive from network storage a preferences image. A preferences image may contain user settings and preferences. In yet another embodiment, the base image or full image may be cached on local device 102. A preferences image may also be cached on local device 102.

Operating system base image server 120, preferences image server 130 and image loader 110 may be configured to combine a base image and a preferences image into a combined image. In an embodiment, the combined image can be used to boot local device 102 in order to provide a full version of an operating system 104 on local device 102. In another embodiment, image loader 110 can be invoked by Basic Input/Output System (BIOS) on the local device. BIOS is firmware or embedded code that initiates hardware components and prepares a computer to run software programs. BIOS is run when a device is first powered on in a process known as booting. BIOS may be loaded on the local device prior to invoking image loader 110. In an embodiment, image loader 110 may be a boot process. In a further embodiment, a remote server may be configured to host at least part of the combined image in order to provide some services to the full version of an operating system on local device 102. In a further embodiment, the combined image could provide a larger or different version of an operating system. In yet another embodiment, the base image server and the preferences image server could reside on the same computer.

Image loader 110 can be configured to perform additional tasks. In an embodiment, combining the base image and preferences image could involve requesting the base or preferences images. In another embodiment, a request may be made after a determination of which images to request based upon information about local device 102. Image loader 110 could be configured to obtain the local device information prior to the determination. Local device information can include, but is not limited to, information about the device hardware or firmware, hardware configuration, which software or operating systems the device is compatible with, what operating system local device 102 is currently running, what operating system or image is cached on local device 102, user preferences, usage type, or what operating system or functionality is desired by the user. In a further embodiment, image loader 110 may also determine how to load the base image and preferences images. In yet another embodiment, image loader 110 can be configured to synchronize the combined image with the cached version of an operating system on local device 102.

In an embodiment, image loader 110 may be a processing device. In another embodiment, image loader 110 may be computer program instructions recorded on a tangible computer readable medium to be executed by a processor. In a further embodiment, image loader 110 may exist remotely, coupled to local device 102 directly or over network 140.

According to an embodiment, any updates or changes to the operating system can be made to the base image. These updates can be propagated to the combined image. The combined image can be used to update the version of the operating system on local device 102. In another embodiment, this update can be performed at any time. The operating system on the local device could be updated without interruption to the user. In some cases, the update can be performed incrementally or all at one time. The update can involve portions of an operating system or a completely new or different operating system. The update could also utilize compression and/or encryption.

Figure 2:
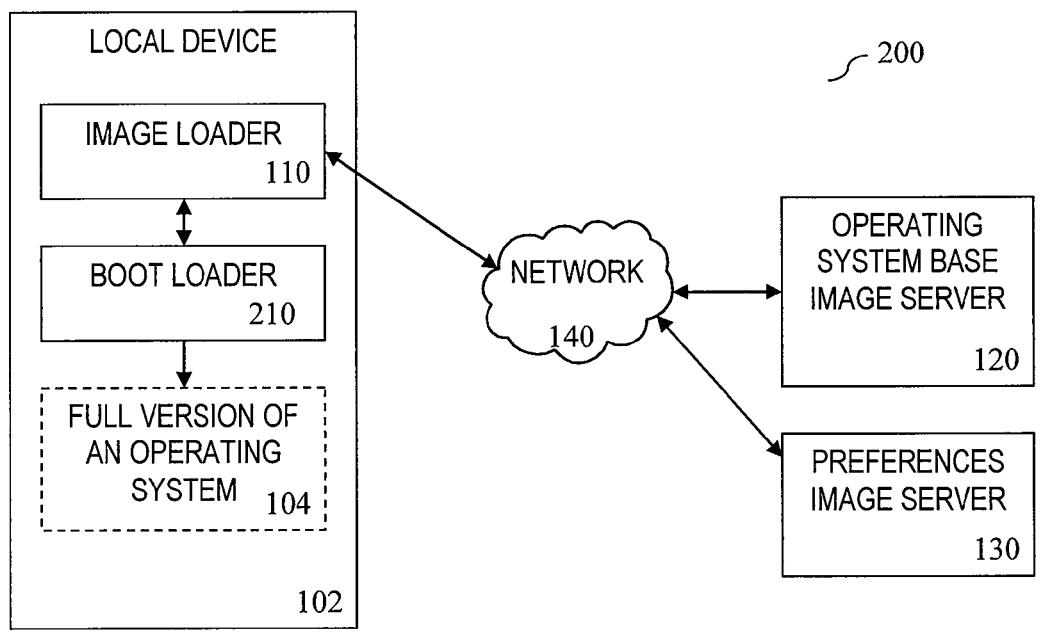
FIG. 2 illustrates a system for providing an operating system, according to an embodiment of the present invention.

FIG. 2 illustrates an exemplary system 200, according to an embodiment of the present invention. System 200 includes local device 102, image loader 110, preferences image server 130, operating system base image server 120 and boot loader 210. In an embodiment, image loader 110 and boot loader 210 reside on local device 102. Local device 102, preferences image server 130 and operating system base image server 120 can be coupled over network 140. In an embodiment, boot loader 210 can be configured to obtain or store local device information for local device 102. In another embodiment, boot loader 210 may provide this information to image loader 110. Boot loader 210 can be configured to obtain the combined image from image loader 110. Alternatively, in a further embodiment, boot loader 210 can be configured to determine an appropriate operating system, base image, or preferences image based upon the local device information and then request the appropriate combined image from image loader 110. In such a case, image loader 110 can be configured to receive that information from boot loader 210. The combined image received by boot loader 210 can be used to boot local device 102 in order to provide a full version of an operating system 104 on local device 102.

Boot loader 210 may be configured to perform other operations. In an embodiment, boot loader 210 can be configured to boot load or assist in boot loading BIOS, image loader 110, boot processes, or even a minimal operating system on local device 102. In another embodiment, boot loader 210 can be configured to synchronize the combined image with a cached version of the operating system on local device 102 in order to provide a full version of an operating system 104 on local device 102. Alternatively, in a further embodiment, boot loader 210 can be configured to synchronize the combined image with the cached version of the operating system on local device 102 in order to provide a larger or different operating system on local device 102.

In another embodiment, boot loader 210 may be a remote server or a network computer, coupled to local device 102 and/or image loader 110 over network 140. In this case, boot loader 210 can be configured to host a portion of the combined image or a version of the operating system in order to perform some of the functions or services of an operating system to local device 102. This could take place while the operating system is in use.

Figure 3:
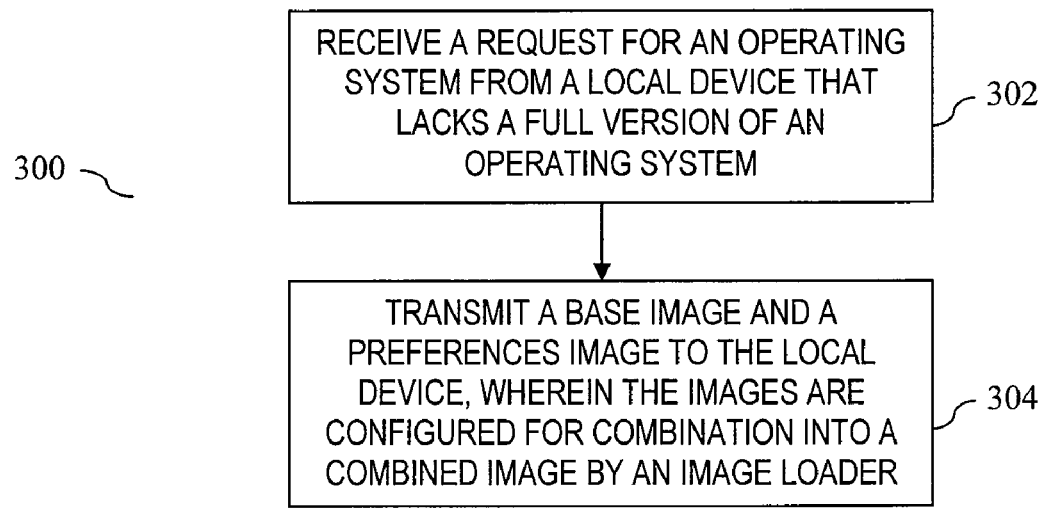
FIG. 3 shows a flowchart illustrating a method for providing an operating system, according to an embodiment of the present invention.

FIG. 3 illustrates an exemplary method 300 for providing an operating system over a network to a local device, according to an embodiment of the present invention (Steps 302-308). A request for an operating system is received from a local device in step 302. The local device may lack a full version of an operating system. The local device may also have a lesser version but not a full version of an operating system. In another embodiment, the base image can be determined based upon local device information. In step 304, a base image and a preferences image are transmitted to the local device. The transmission could take place incrementally. The transmission could also be performed using compression and/or encryption. The images are configured for combination into a combined image. In an embodiment, image loader 110 can combine the images to create a combined image. In another embodiment, the transmission step 304 can occur while the operating system is being used on the local device. In yet another embodiment, steps 302 and 304 may be performed by boot loader 210.

Other tasks could be performed. For example, the new version of the operating system could be removed or deleted from the local device when the user logs off or exits the operating system on the local device. In another example, preferences information could be transmitted back to preference image server 130. In another embodiment, the new version of the operating system could provide a virtual disk file system. The virtual disk file system could be associated with a remotely stored file system. The files of the virtual disk file system could be synchronized with files of the remotely stored file system. In a further embodiment, synchronization can involve fully replicating files and applications of the new version of the operating system on the local device.

Figure 4:
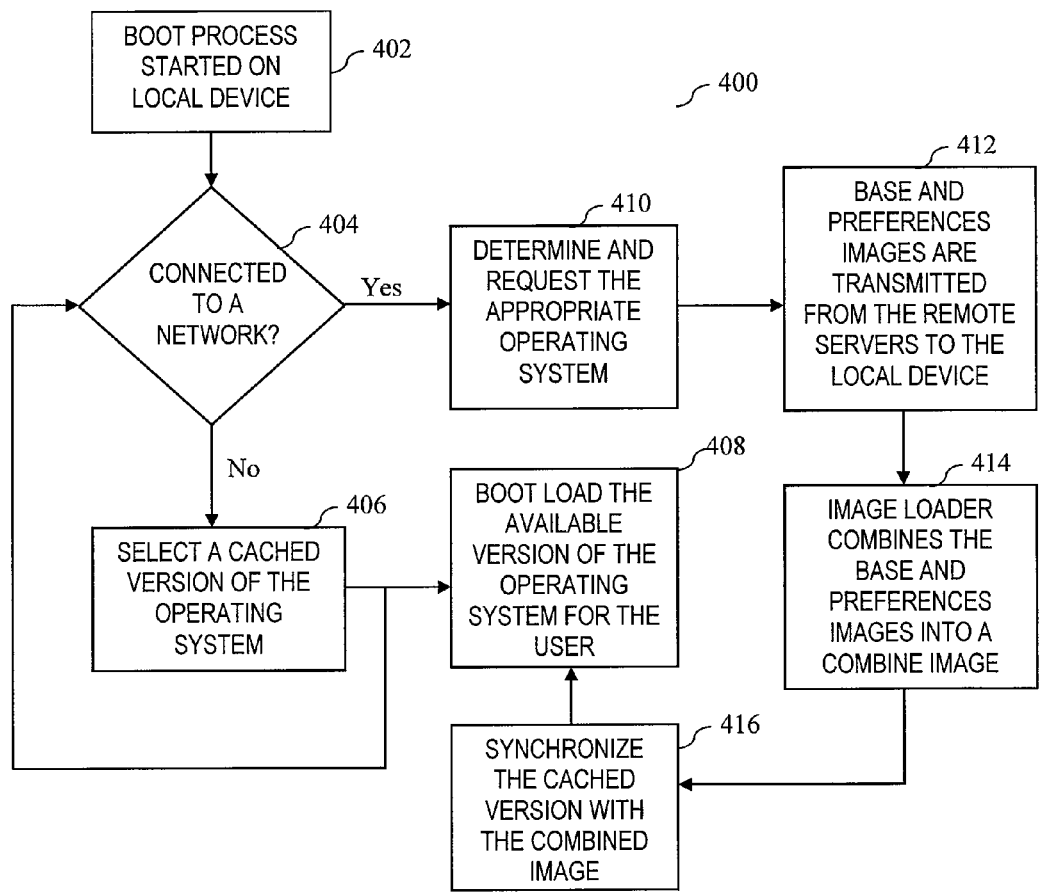
FIG. 4 shows a flowchart illustrating a method for providing an operating system, according to an embodiment of the present invention.

FIG. 4 shows a flowchart illustrating a method 400 for providing an operating system over a network to a local device, according to an embodiment of the present invention. Step 402 begins by starting the boot process on the local device. Next, it is determined whether the local device is connected to remote image servers over the network 404. If a connected status is detected, according to an embodiment, then an appropriate operating system is determined and remotely stored images are requested from the remote image servers 410. Local device information such as the hardware configuration of the local device or usage type may be used to determine the base and preferences images. The remote image servers transmit the base and preference images to the local device 412. The image loader combines the base and preferences images into a combined image in step 414. In an embodiment, steps 410 and 414 may be performed by image loader 110. Step 416 involves synchronizing the combined image between the local device and possibly a cached version of the operating system in order to provide the synchronized version of the operating system on the local device. The operating system is then booted, displayed and operable on the local device 408. In an embodiment, step 408 may be performed with the assistance of boot loader 210. According to another embodiment, steps 410, 412, 414 and 416 can repeat as necessary during step 408.

If a network connection is not detected, according to an embodiment, then step 406 involves selecting the cached version of the operating system on the local device. The cached version of the operating system is boot loaded on the local device as in step 408. Step 404 may be repeated until a network connection is detected.

According to an embodiment, if a connected status is detected subsequent to an unconnected status, an appropriate operating system is determined and requested 410 and steps 412, 414, 416 and 408 can then take place. In another embodiment, steps 412, 414 and 416 occur without a substantial interruption to the user during step 408.

In another embodiment, a method for providing a full version of an operating system is provided. This computer-implemented method includes storing or hosting the full version of the operating system on a remote application server. The method further includes providing a third party use of the full version of the operating system under various licensing terms. These licensing terms may include a free basis, a per use basis, a per seat basis, a timed basis, a float basis, or on any other appropriate licensing terms suitable for software. The third party can receive the full version of the operating system on a local device from the remote application server. In another embodiment, the remote application server can host at least a portion of the full version of the operating server for operation on the local device. In a further embodiment, the remote application server can provide remote services to the full version of an operating system while the full version is in use on a local device.

Remote administration of an operating system may be performed, according to an embodiment. Remote administration may include, among other things, network service, updates, backup, recovery, user profile management, filtering and monitoring of preferences, and integration of other applications and plug-ins. Remote administration may also include virus protection, security, restoration of older preferences, and progression. According to another embodiment, remote administration may be performed for a stored base image. According to a further embodiment, remote administration may be performed for a stored preferences image. According to another embodiment, remote administration may be performed for a combined image. According to yet another embodiment, remote administration may be performed for a combined image during operation of the combined image.

Aspects of the present invention, for example system 100, system 200, method 300 and/or method 400 or any part(s) or function(s) thereof may be implemented using hardware, software, firmware, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for providing an operating system over a network to a local device, comprising:
   a base image server configured to transmit a base image of the operating system;
   a preferences image server configured to transmit at least one preferences image; and
   an image loader configured to combine the base image and the at least one preferences image into a combined image at the local device in order to provide a full version of the operating system on the local device and automatically remove the full version of the operating system from the local device when logging off or exiting the full version of the operating system on the local device.

2. The system of claim 1, wherein the image loader is further configured to determine at least one of an appropriate base image or an appropriate preferences image for the local device.

3. The system of claim 1, further comprising a synchronizer configured to synchronize a base image on the local device with a base image on the base image server in order to provide a synchronized version of the full version of the operating system on the local device.

4. The system of claim 1, wherein the local device includes a Basic Input/Output System (BIOS), and the BIOS on the local device loads the image loader at boot time.

5. The system of claim 1, comprising a boot loader configured to boot load the combined image on the local device.

6. The system of claim 5, wherein the boot loader is further configured to:
   determine at least one of an appropriate base image or an appropriate preferences image for the local device based upon local device information; and
   obtain the combined image from the image loader based upon the determination.

7. A computer-implemented method for providing an operating system over a network to a local device, comprising:

receiving a request for an operating system from the local device based upon local device information, wherein the local device lacks a full version of an operating system; and transmitting a base image from a base image server and at least one preferences image from a preferences image server to the local device, whereby the base and preferences images can form a combined image by an image loader on the local device in order to provide the full version of the operating system on the local device, and wherein the full version of the operating system is automatically removed from the local device when logging off or exiting the full version of the operating system on the local device.

8. The computer-implemented method of claim 7, further comprising synchronizing the full version of the operating system between the local device and at least one of the base image server and the preferences image server in order to provide a synchronized version of the full version of the operating system on the local device.

9. The computer-implemented method of claim 7, wherein the transmitting comprises at least one of compressing the base image, encrypting the base image, and transmitting the base image incrementally.

10. The computer-implemented method of claim 7, wherein the full version of the operating system on the local device can be updated by transmitting an update of at least one of the base image or preferences image to the local device at run-time while the full version of the operating system is in use by a user.

11. The computer-implemented method of claim 10, comprising synchronizing the full version of the operating system on the local device with the update of the at least one of the base image or preferences image in order to provide a synchronized version of the full version of the operating system on the local device.

12. The computer-implemented method of claim 11, wherein the synchronizing step comprises fully replicating files and applications of the full version of the operating system on the local device.

13. The computer-implemented method of claim 7, wherein the full version of the operating system provides a virtual disk file system and wherein the virtual disk file system is associated with a remotely stored file system.

14. The computer-implemented method of claim 13, wherein files of the virtual disk file system on the local device are synchronized with files of the remotely stored file system.

15. The computer-implemented method of claim 7, comprising determining at least one of an appropriate base image or an appropriate preferences image for the local device based upon local device information.

16. The computer-implemented method of claim 15, wherein the local device information comprises at least one of hardware configuration or usage type.

17. The computer-implemented method of claim 8, wherein at least one of the full version of the operating system on the local device, a portion of the full version of the operating system, and at least one desirable application on the local device may be synchronized to a second device.

18. A computer-implemented method for providing an operating system over a network to a local device, comprising:

determining a status of a network connection between the local device and a remote base image server, wherein the local device lacks a full version of the operating system;

upon detecting a connected status of the network connection subsequent to an unconnected status of the network connection, receiving a request for an appropriate operating system from the local device, wherein the appropriate operating system is determined based upon at least one of a hardware configuration of the local device or a cached version of an operating system on the local device; and based upon the determination, transmitting a remotely stored operating system base image and a remotely stored preferences image, wherein the base and preferences images are configured for combination by an image loader on the local device in order to provide the full version of the operating system on the local device and wherein the full version of the operating system is automatically removed from the local device when logging off or exiting the full version of the operating system on the local device.

* * * * *

UNITED STATES PATENT AND TRADEMARK OFFICE
CERTIFICATE OF CORRECTION

| | | |
|---|---|---|
| PATENT NO. | : 8,239,662 B1 | |
| APPLICATION NO. | : 12/408247 | |
| DATED | : August 7, 2012 | |
| INVENTOR(S) | : Jeffrey Nelson | |

It is certified that error appears in the above-identified patent and that said Letters Patent is hereby corrected as shown below:

Title Page
Item (57), ABSTRACT, please replace "including the synchronizing the combined image" with --include synchronizing the combined image--.

Signed and Sealed this

Thirteenth Day of November, 2012

David J. Kappos
*Director of the United States Patent and Trademark Office*